United States Patent
Dharmadhikari et al.

(10) Patent No.: US 9,794,651 B2
(45) Date of Patent: Oct. 17, 2017

(54) SYSTEMS AND METHODS FOR PROFILING OF HARDWARE COMPONENTS OF COMPUTING DEVICES

(71) Applicant: DELL PRODUCTS L.P., Round Rock, TX (US)

(72) Inventors: Vivek Dharmadhikari, San Jose, CA (US); James Laurance Mangin, San Ramon, CA (US); Vinay Sawal, Fremont, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 176 days.

(21) Appl. No.: 14/474,079

(22) Filed: Aug. 29, 2014

(65) Prior Publication Data
US 2016/0066066 A1     Mar. 3, 2016

(51) Int. Cl.
*H04Q 9/00*     (2006.01)

(52) U.S. Cl.
CPC .................................... *H04Q 9/00* (2013.01)

(58) Field of Classification Search
CPC .. H04Q 9/00; H04Q 2209/47; H04Q 2209/60; G01R 21/133
See application file for complete search history.

(56) References Cited

U.S. PATENT DOCUMENTS

| | | | |
|---|---|---|---|
| 9,244,519 B1* | 1/2016 | Ellis | G06F 13/38 |
| 2013/0229947 A1* | 9/2013 | Vaswani | G01D 4/004 |
| | | | 370/254 |
| 2014/0035548 A1* | 2/2014 | Oaklander | H03K 17/063 |
| | | | 323/283 |

OTHER PUBLICATIONS

Luca Niccolini et al., "Building a power-proportional software router," Proceedings of the 2012 USENIX Annual Technical Conference, Jun. 2012 (12pgs).
Priya Mahadevan et al., "A Power Benchmarking Framework for Network Devices," HP Labs, Palo Alto, CA, http://www.hpl.hp.com/personal/Puneet_Sharma/docs/papers/networking2009.pdf (14pgs).

* cited by examiner

*Primary Examiner* — Ted Wang
(74) *Attorney, Agent, or Firm* — North Weber & Baugh LLP

(57) ABSTRACT

Aspects of the present invention include telemetry measurement in a networking device. In embodiments of the present invention, fine granularity power measurement can be achieved at a component level within a networking device without additional hardware like a multi meter. Coarse level granularity of power management can also be achieved in embodiments of the present invention.

20 Claims, 6 Drawing Sheets

200

SYSTEMS AND METHODS FOR PROFILING OF HARDWARE COMPONENTS OF COMPUTING DEVICES

BACKGROUND

Field of Invention

The present invention relates generally to power consumption and relates more particularly to power efficient networking devices.

Description of the Related Art

Measurement of power consumption is typically done in a testing environment only. It is also typically done for a component as a whole. In other words, a multi meter can be connected to an entire networking device to determine the power consumption of the network. However, there are draw backs to the prior art system and method for power measurement.

It is important and beneficial to determine the power consumption of a particular component of a networking device. To build power efficient networking devices such as routers or switches, it is first important to profile it power consumption. Accurate measurement of power consumption of networking devices enables development of efficient power management schemes for them.

Current solutions to the networking devices have following drawbacks that make them difficult to be used widely:

First, the prior art solutions require external hardware such as a power meter or multi meter which needs to be plugged between the wall socket and networking devices. In other words, the networking devices needs to be unplugged from its power source and plugged into power meter or multi meter. This system has several drawbacks. First, it cannot measure power consumption on a component level, but can only measure course grain power consumption. Second, it is inflexible and requires extra equipment, the multi meter or power meter. It cannot readily be deployed in a live network or in a network used in a design process.

Also, the prior art solutions can only provide aggregate power consumption of entire networking devices. The prior art solutions cannot answer the question "Where does the power go in networking devices?" For example, Ethernet switches consist of specialized hardware components such as network processors, Fan Trays, Central Processing Unit (CPU), memory, etc. Currently, there is no easy and accurate way to determine the power consumption of Ethernet switch components.

In some prior art systems the power consumption is based on estimation. In this system, the power consumption of the entire networking device is estimated by adding together the maximum power consumed by hardware components. The maximum power consumed by hardware components is derived by its data sheet. This system provides only maximum rated power consumption of the networking device and does not indicate its actual power consumption. This system also provides only coarse grained power consumption of the networking device.

In other prior art systems the power consumption is based on models or simulations. This system relies on building models or simulations to predict the power consumption of the networking device. This system provides only coarse grained power consumption of the networking device and lacks from accuracy due to use of models and is inflexible to use. It is also not guaranteed to be accurate. Further, it cannot be deployed in a live, running network.

Another prior art system involves physically removing the components. Fine grained power consumption is measured by power consumed by various networking device components (Memory, CPU, Fan, etc). The method adapted to measure power consumed by various components was to measure power with all components (P0) in the system and then physically remove each component and measure power again (P1). The difference (P1−P0) is then power consumed by the component. This too has several drawbacks. It cannot be deployed in a live, running network. It can only be used in a test environment. It also suffers from accuracy problems since the components must be removed.

Lastly, the prior art solutions do not offer Application Programming Interfaces (APIs) that a developer can use to query the power consumption data, which is needed for developing power management algorithms.

One disadvantage of this system is that it cannot be deployed in a live network. Another disadvantage is that power consumption cannot be accurately measured at a component level.

Accordingly, what is needed are systems and methods that can determine power consumption for each component individually and that of the whole system. Furthermore what is needed are systems and methods that can be deployed in a live, running network and a design environment as well as in a test environment.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DESCRIPTION OF THE PREFERRED EMBODIMENTS

Figure 1:
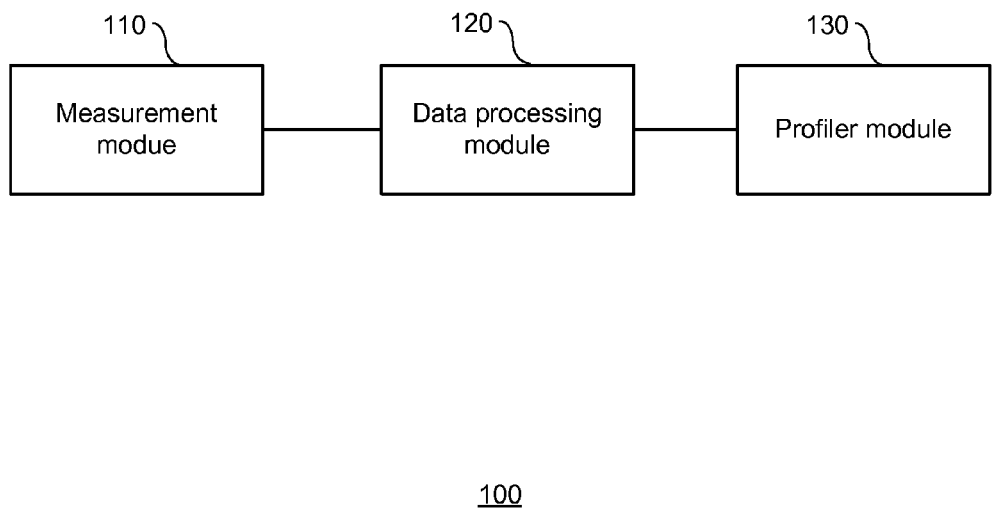
FIG. 1 depicts a block diagram according to embodiments of the present invention.

In the following description, for purposes of explanation, specific examples and details are set forth in order to provide an understanding of the invention. It will be apparent, however, to one skilled in the art that the invention may be practiced without these details. Well known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including being done some steps being done concurrently.

The present invention relates in various embodiments to devices, systems, methods, and instructions stored on one or more non-transitory computer-readable media involving the communication of data over networks. Such devices, systems, methods, and instructions stored on one or more non-transitory computer-readable media can result in, among other advantages, the ability to deploy power measurement on a component level in a live network or to design network devices.

It shall also be noted that although embodiments described herein may be within the context of power consumption in a network device, the invention elements of the current patent document are not so limited. Accordingly, the invention elements may be applied or adapted for use in other contexts.

It is important to be able to measure the power consumption of a device on a component level. Ideally, each component should operate in its "sweet spot" of power consumption. Having each component operate within their ideal power specifications can extend the life of the component and therefore the device.

Further, a device or an entire network can be designed to optimize for power consumption if the power consumption of a particular component can be accurately measured in a live network. Thus advantages can be achieved, such as analysis of power consumption at a component level deployed in a live network or during design of network devices.

Embodiments of the present invention have many advantages. For example, they allow power consumption to be evaluated at a component level. Other advantages include the ability to be deployed in a live network. For example, the embodiments of the present invention permit load balancing across a network due to the ability to measure telemetry data at the component level in a live network configuration.

Embodiments of the present invention overcome the deficiencies of the prior art power measurement systems. Embodiments of the present invention comprise power distribution network and software to gather telemetry data from inside the networking devices. Embodiments of the present invention allow building a power profiler for a networking device which can have the following features:

One feature is that the need to use external hardware, like power-meter/multi-meter to measure power consumption, is eliminated. Another feature is that coarse grained power consumption, i.e., aggregate power consumption of the entire networking devices is provided. Yet another feature of embodiments of the present invention is that fine grained power consumption, i.e., component level power consumption of the networking device can be provided. In other words, it provides answers to question "Where does the power go in networking devices?"

FIG. 1 depicts a block diagram according to embodiments of the present invention. FIG. 1 shows a measurement module 110, a data processing module 120, and a profiler module 130.

Figure 2:
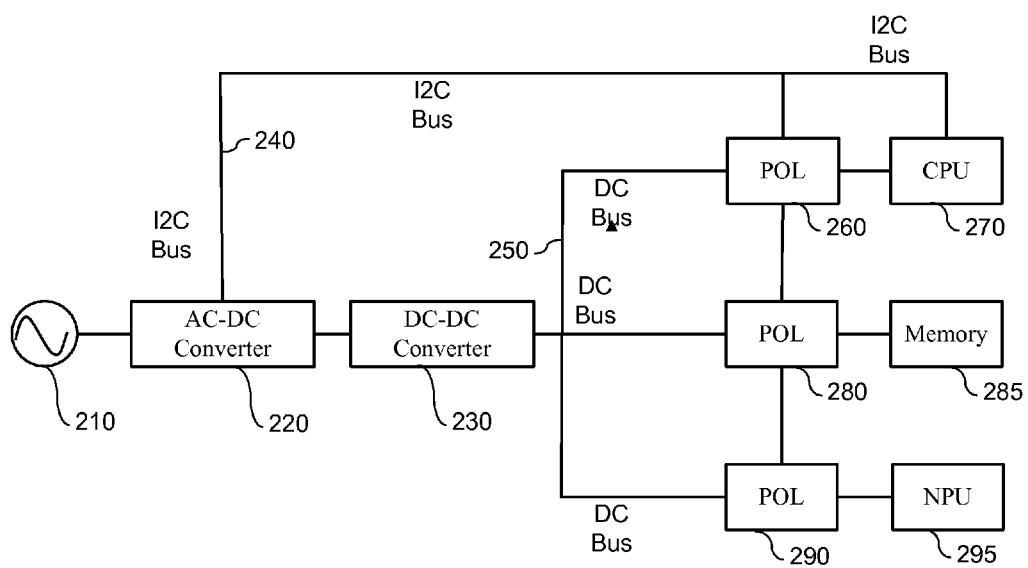
FIG. 2 depicts an example of a power measurement module according to embodiments of the present invention.

The measurement module 110 consists of power distribution network comprising digital Point-of-load (POL) devices to monitor and control power delivered to strategic components such as Central Processing Unit (CPU), memory, Networking Processing Unit (NPUs), Field Programmable Gate Arrays (FPGA), Fan Trays, Power Supply Unit (PSU), etc. FIG. 2 provides more detail as to one embodiment of hardware that can be implemented as the measurement module 110.

The data processing module 120 can be implemented as a kernel driver running on a processor which does read/write to the POL to gather power consumption data using protocol such as Power Management Bus (PMBUS). Data processing can be local or external to the networking device. The data processing module 120 can read data such as current voltage, current, power, temperature, etc. from the POL. This data provides the current state of the system with respect to power.

The profiler module 130 can be implemented as a software application, which interfaces with the data processing module to collect power consumption data and profile the power consumption over a period of time. The profiler module 130 can be inside or outside of the data mining device. For example, the profiler module 130 periodically, e.g., every one minute, instructs the data processing module 120 to read/write data. The profiler than act on that data to interpret it. For example, the profiler module 130 can display every minute the power consumed by the whole device or its components and calculate dollar cost of operating entire device and its components. The profiler module 130 can run on a processor or server locally or outside of the networking device.

Embodiments of the present invention can be implemented as a service of networking device operating system. It can run in kernel and provide APIs that applications use to query the coarse and fine grained power consumption. This permits the power management scheme to be implemented. For example, using the power consumption data gleaned from API, it is possible implement power management schemes.

FIG. 2 depicts an example of a power measurement module according to embodiments of the present invention. FIG. 2 shows an alternating current (AC) source 210. AC source 210 can be a 120-220 V power source. FIG. 2 also shows an AC-to-DC converter 220. The AC source can be a PSU, which can take line voltage (120-240V) from the utility and covert the AC voltage source into DC, e.g. 48V DC. In one embodiment, the AC-DC converter 220 interfaces to the host CPU using industry standard I2C bus. However any bus structure can be used.

FIG. 2 also shows DC-DC converter 230. DC-to-DC converter 230 converts output from AC-to-DC converter 120 into voltage ranges suitable for feeding as input to the POL 260, 280, or 290. POLs 260, 280, and 290 can be step down DC-to-DC converters. They can measure any relevant telemetry including temperature, amount of current, amount of voltage or amount of output power. Further, the measurements can be instantaneous or average measurements. POLs 260, 280 and 290 can be simple or complex DC to DC converters. Further, POLs can have hardware with firmware running on them to store telemetry.

POLs 260, 280, or 290 accept power input from DC-to-DC converter 230 and provide DC power to individual circuit block also known as load in the system such as CPU, memory, NPU, etc. POL 260 interfaces to host CPU 270 using industry standard I2C bus. However, one of ordinary skill in the art will appreciate that any appropriate bus can be used.

I2C bus 240 can be used to wire PSU and POLs to CPU. The I2C bus acts as channel over which telemetry data such as current voltage/current/power/temperature can be conveyed to CPU 270.

Each POL 260, 280, and 290 can be coupled to a different network device component. For ease of illustration only three components are shown. However, any number of components could be measured using an appropriate number of POLs. FIG. 2 shows POL 260 coupled to CPU 270, POL 280 coupled to memory 285, and POL 290 coupled to NPU 295.

Figure 3:
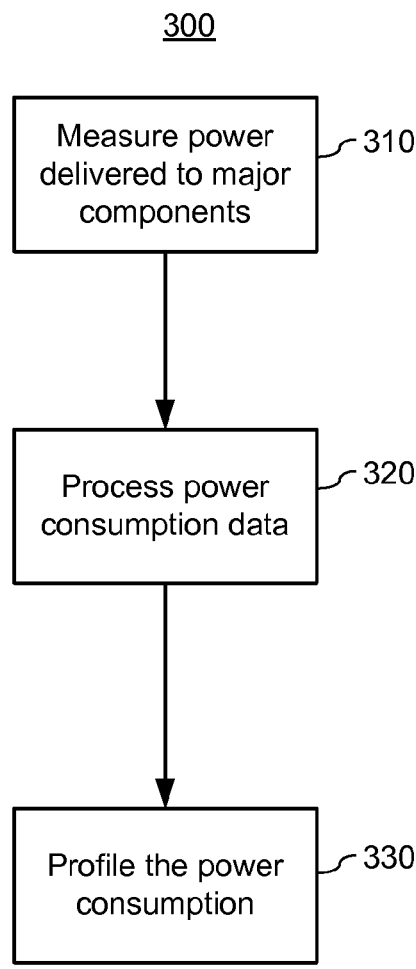
FIG. 3 depicts a flowchart for measuring and controlling power consumption according to embodiments of the present invention.

FIG. 3 depicts a flowchart for measuring and controlling power consumption according to embodiments of the present invention. FIG. 3 shows measuring power delivered to major components. Embodiments of the present invention measure power delivered to major components. Furthermore, there are a number of telemetry points that can be measured besides power, for example, temperature, current, or voltage. FIG. 3 also shows processing the power consumption data. A software interface can query the POL and get data from the POL. FIG. 3 also shows profiling the power consumption 330. The power consumption at a fine granularity can be profiled to determine the likelihood of failure, when a component will fail, perform load balancing, etc.

Figure 4:
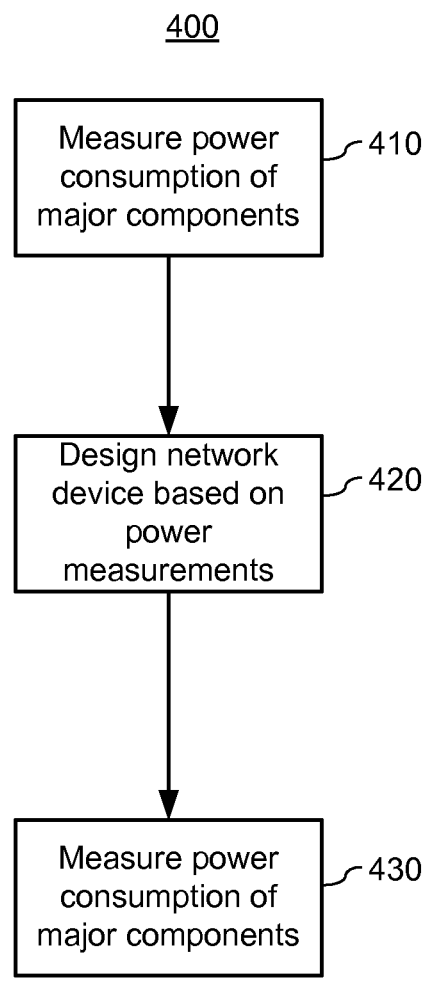
FIG. 4 depicts a flowchart for designing a network device according to embodiments of the present invention.

FIG. 4 depicts a flowchart for designing a network device according to embodiments of the present invention. FIG. 4 shows measuring power consumption of major components 410, designing a network device based on power measurements 420, and measuring power consumption of major components 430. A network device can be designed using the present invention. For example, based on temperature measurements, a device can be designed to improve cooling for certain components. Further, components can be redesigned such that the device operates to keep all components running in their sweet spot.

Figure 5:
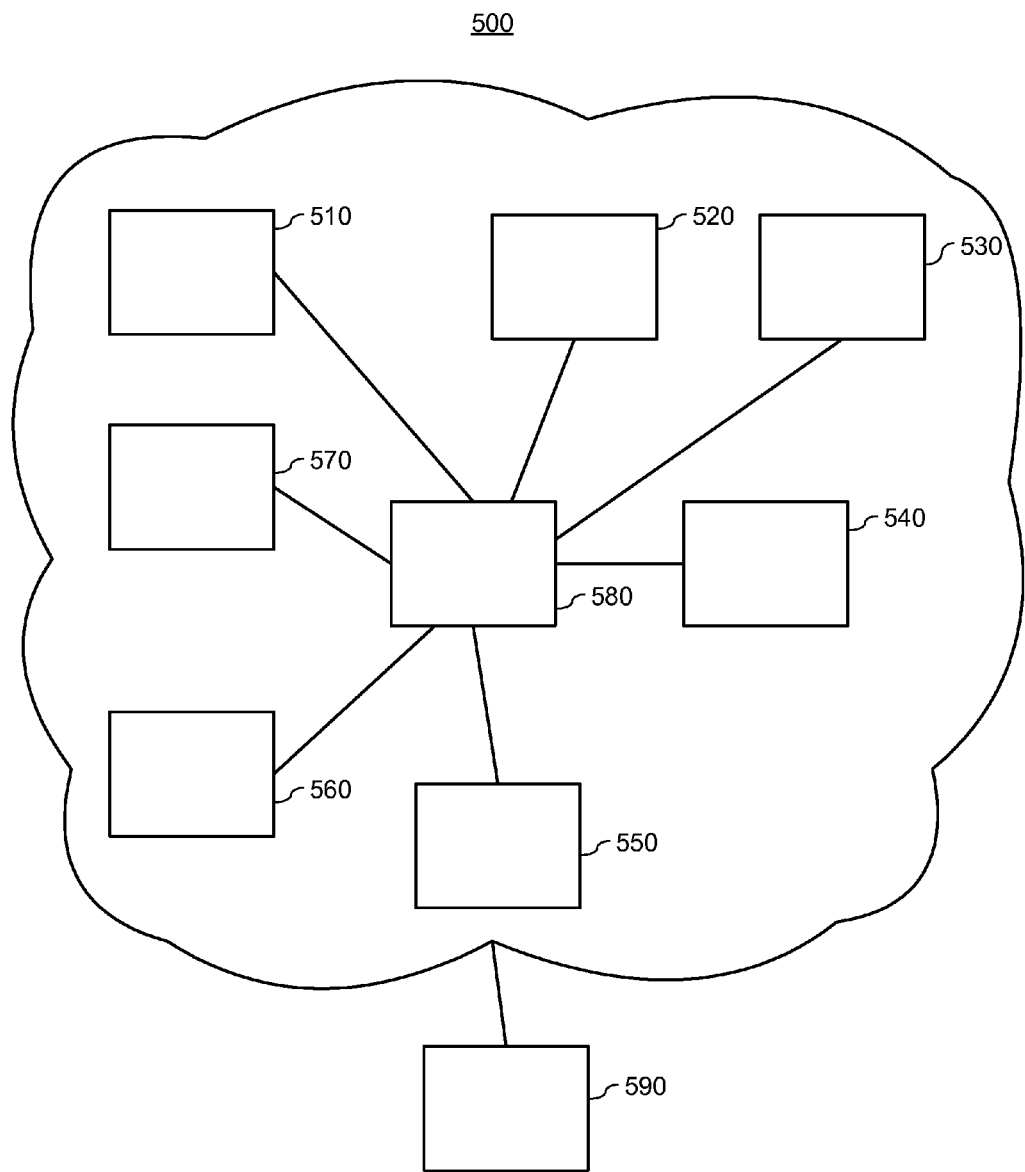
FIG. 5 depicts a network topology according to embodiments of the present invention.

FIG. 5 depicts a network topology according to embodiments of the present invention. FIG. 5 illustrates a collection of network devices 510, 520, 530, 540, 550, 560, 570, and 580. FIG. 5 also illustrates network management 590. Network management can run network management software that can gather telemetry data such as power and temperature from all the network devices 510-580. For example, if the network management 590 concludes that network device 580 is running too hot, the load can be balanced to reduce the network device's 580 load.

Figure 6:
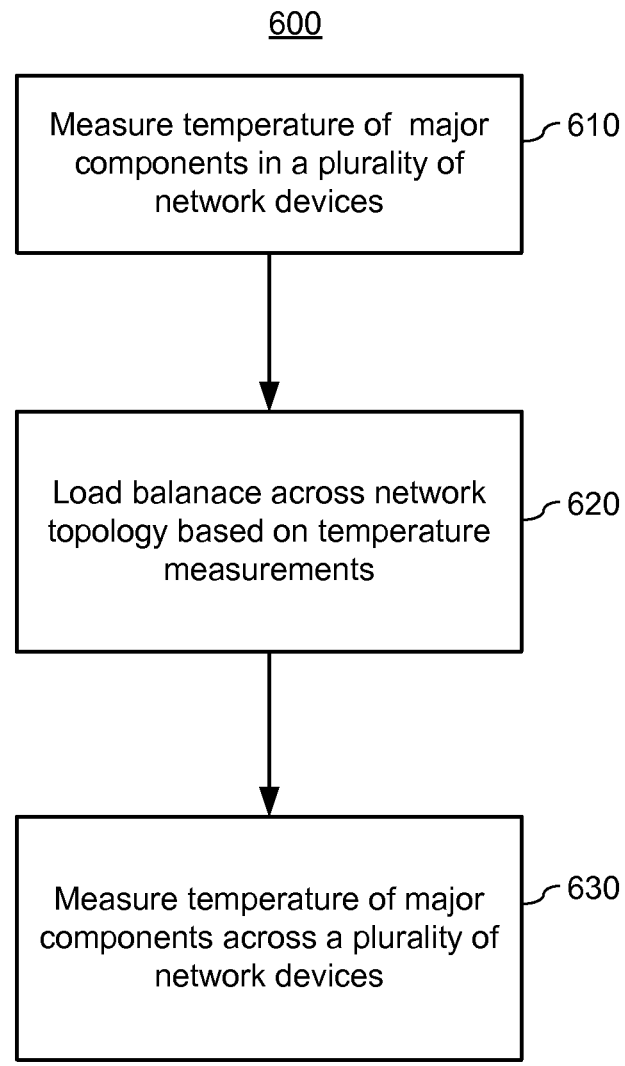
FIG. 6 depicts a flowchart for load balancing across a network according to embodiments of the present invention.

FIG. 6 depicts a flowchart for load balancing across a network according to embodiments of the present invention. FIG. 6 shows measuring temperature of major components in a plurality of network devices 610, load balancing across network topology based on temperature measurements 620, and measuring temperature of major components across a plurality of network devices 630. As described above, load balancing can be performed if a network device is running too hot or using too much power. The above example is of load balancing using temperature as the criterion, but the present invention is not limited to temperature only. In embodiments of the present invention it is possible to perform load balancing based on other parameters such as power.

Often the network devices are employed in a large data center. Large data centers may have hundreds of networking devices. One advantage of the present invention is cost savings to the data centers. Cooling costs are significant costs for a data center. A more efficient power usage and temperature usage system can save significant amounts of money for a data center.

Another advantage of the present invention is that the software used in the present invention can help automate more functions at data centers. For example, failure prediction can be automated, cooling can be automated, load balancing can be automated, etc.

One of ordinary skill in the art will appreciate that various benefits are available as a result of the present invention. One such benefit is that embodiments of the present invention completely eliminates need to use external hardware like power meter/multi meter to measure power consumption of the networking device. This benefit permits power measurement to be done anywhere (lab or field) and anytime.

Another benefit is that embodiments of the present invention provide coarse grained power consumption, i.e., aggregate power consumption of the entire networking device. This coarse grained power consumption is done by reading telemetry data such as current voltage/power from front end AC-to-DC converter (PSU). Thus, enabling many interesting applications to be developed. For example, it is possible to develop application that calculates the monthly electric bill for the networking devices. This calculation is done by periodically logging power consumption data and multiplying it by the current time of day and utility company rate to get the electric bill.

Embodiments of the present invention provide fine grained power consumption, i.e., component level power consumption of the networking devices. This fine grained power consumption is done by importing telemetry data such as current voltage/current/power from POL attached to important system components. For example, power consumption of the NPU can be obtained by probing POL attached to NPU and likewise.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. A power measurement system in a computing device, comprising:
    a power measurement circuitry including point of load circuitry for measuring telemetry data associated with each component of a plurality of components within the computing device while the computing device is operational;
    a processing module communicatively coupled via a bus to the power measurement circuitry for accessing telemetry data from the power management circuitry about a component from the plurality of components; and
    a profiling component for profiling telemetry data measured about at least one component from the plurality of components.

2. The power measurement system of claim 1 wherein the system is used to design a networking device.

3. The power measurement system of claim 1 wherein the system is used in a deployed network.

4. The power measurement system of claim 1 wherein at least some of the telemetry data measured is related to temperature.

5. The power measurement system of claim 2 wherein the temperature measured is instantaneous or near instantaneous.

6. The power measurement system of claim 2 wherein the temperature measured represents an average over a time period.

7. The power measurement system of claim 1 wherein at least some of the telemetry data measured is related to current.

8. The power measurement system of claim 1 wherein at least some of the telemetry data measured is related to voltage.

9. A method for power management in a computing device, comprising:
    using a data processor communicatively coupled to a measurement circuitry via a bus to gather telemetry data associated with each component of a plurality of components within the computing device while the computing device is operational;
    using at least some of the telemetry data measured about at least one of the components from the plurality of components to create a profile of the at least one of the components.

10. The method of claim 9 wherein at least some of the telemetry data measured is related to temperature.

11. The method of claim 9 wherein at least some of the telemetry data measured is related to voltage.

12. The method of claim 9 wherein at least some of the telemetry data measured is related to current.

13. The method of claim 9 further comprising load balancing across a network based on the processed telemetry measured.

14. The method of claim 9 wherein the telemetry measured is used in design of a computing device.

15. The method of claim 9 wherein the profile of the at least one of the components is a profile over time regarding one or more telemetry metrics about one component.

16. A measurement system for measuring one or more metrics about one or more components in a computing device, the measurement system comprising:
    for each component from a set of components from the computing device:
        a measurement circuitry for measuring data related to one or more metrics associated with the component; and
        a bus communicatively coupling the measurement circuitry to a data processor for communicating data with the measurement circuitry; and
    the data processor communicatively coupled via buses to the measurement circuitries for communicating data with the measurement circuitry about one or more of the components from the set of components.

17. The measurement system of claim 16 wherein the measurement circuitry comprises a point of load component.

18. The measurement system of claim 17 wherein a point of load component controls power delivered to the component associated with the point of load device.

19. The measurement system of claim 16 further comprising:
    a profiling component that uses at least some of the data to generate a profile about a component.

20. The measurement system of claim 19 wherein the profiling component uses at least some of the data to generate a profile about two or more components.

* * * * *